United States Patent Office 3,350,406
Patented Oct. 31, 1967

3,350,406
ELASTOMERS AND PLASTICIZER FROM MIXTURES OF THIOETHER COMPOUNDS AND EPOXY RESINS WITH ACIDS
Glen E. Meyer, Kent, and Felix J. Naples, Akron, Ohio, assignors to The Goodyear Tire & Rubber Company, Akron, Ohio, a corporation of Ohio
No Drawing. Filed Aug. 11, 1961, Ser. No. 130,767
20 Claims. (Cl. 260—30.8)

This invention relates to novel compositions of matter comprising reaction mixtures of at least one organic compound containing at least one thioether group, with at least one organic compound containing at least one epoxy group, and at least one acidic organic compound, said acidic organic compound being present in an amount sufficient to effect the reaction between the ingredients of the reaction mixture at a suitable temperature. It also relates to the products of said reactions.

More particularly, this invention relates to methods of increasing the molecular weights of compounds containing at least one reactive thioether group by reacting these thioether containing compounds with compounds containing at least one epoxy group and acidic organic compounds or acid-yielding compounds, where at least two of said compounds contain at least two substituent groups whether they be thioether, epoxy or acid groups, to materially increase the viscosity or cure the reaction mixture.

A specific embodiment of this invention relates to the reaction of compounds containing more than one thioether group resulting from the chemical addition of organic mercaptans to the double bonds of unsaturated materials having molecular weights of at least about 150 and preferably 250 or higher, with epoxy compounds and organic acids or organic acid-yielding compounds to produce cured resinous or elastomeric materials, said acids or acids from the acid-yielding materials being preferably difunctional when the epoxy compound contains only one epoxy group per molecule.

The prior art teaches that epoxy compounds react with other compounds containing active hydrogens, such as those found in amines, carboxylic acids and mercaptan groups to cure the epoxy compounds. The thioether group of an organic compound does not contain active hydrogens; therefore, the discovery that an organic compound which contained at least one thioether group but which contains no active hydrogens could be reacted with an epoxy compound in the presence of an organic acid to produce compositions satisfactory as plasticizers or as elastomers was truly unexpected.

A principal object of this invention is to provide methods of forming reaction mixtures comprising active thioether containing compounds, compounds containing epoxy groups, and acids, where one of said compounds contains more than a single substituent or group such as epoxy, thioether or acids and to react said mixtures to provide reaction products. A further object of this invention is to provide new methods of curing epoxy compounds. Another object of this invention is to provide other methods for curing polymers containing more than one active thioether group. A further object of this invention is to provide methods for reacting low molecular weight, liquid thioether-containing compounds to convert the liquid into viscous or solid materials which are useful as plasticizers, caulking compositions, and protective coatings. Another object of this invention is to provide new products useful as plasticizers, caulking compositions, protective coatings and elastomers by reacting compounds containing at least one active thioether group with epoxy compounds in the presence of sufficient activator comprising acids or acid-yielding substances under the reacting conditions, said acids being polyfunctional when the epoxy compounds contain a single epoxy group but being either single or polyfunctional when the epoxy compounds contain more than a single epoxy group. Still other objects of this invention are to provide methods of fixing mobile compounds containing at least one active thioether group within a more viscous material by reacting said active thioether group with epoxy compounds in the presence of acidic activators.

An ancillary object of this invention is to provide another curing system for adducts containing pendant thioether groups obtained by the chemical addition of at least one or more organo mercaptans to a portion of the double bonds of an unsaturated homopolymer or a copolymer of a diene monomer, said curing system to be compatible with and useful conjointly with the conventional curing recipes such as sulfur, peroxides and the like for these mercaptan adducts and thereby improve the cure obtained with these conventional cure systems.

It has been discovered that the objects of this invention can be accomplished (1) by forming a reaction mixture comprising (a) at least one organic compound containing at least one active thioether group and preferably having a molecular weight in excess of 150, (b) at least one organic compound containing at least one active epoxy group, and (c) at least one organic acidic compound which is present in an amount sufficient to have at least about one acid group for each epoxy group reacting, and (2) reacting said mixture at a suitable temperature and pressure to effect the reaction of (a), (b) and (c). It has been discovered that by varying the nature of (a), (b) and (c) above, these reaction products may vary in nature from a fluid to a solid substance. For example, where the substituents of (a), (b) and (c) above are monofunctional in nature, viz, the functional groups are epoxy, thioether and acids, the resulting reaction product normally will be a liquid or a viscous semisolid depending on the molecular weight of these three materials. On the other hand, if at least two of the materials contain at least two functional reactants per molecule, the resulting products may be a hard brittle plastic or leathery material or even elastomeric in nature, due to chain extension or curing of the mixture.

Where it is desired to use relatively low molecular weight liquid compounds containing either thioether or epoxy groups as plasticizers for polymeric or rubbery compounds, the resistance of these low molecular weight thioether compounds to migration within the polymeric or rubbery compound can be increased by forming in situ within the plasticized compositions a reactive mixture composed of epoxy compounds, thioether compounds and sufficient acidic materials to have at least about one equivalent of acid for each epoxy group to be reacted and then allowing said mixture to react, thereby reducing the tendency of the plasticizers to exude from the plasticized compositions.

This technique permits relatively volatile, non-gaseous, low molecular weight thioether compounds to be used as processing aids and yet still allows these plasticizers to be fixed within the plasticized compositions after the compositions have been shaped. In accordance with this concept, plasticizable solid materials can be shaped with relative ease when plasticized in this manner and then can be stabilized by the reaction of the ingredients of the reaction mixture usually by the application of heat to reduce the mobility of the plasticizer after the article has been shaped.

Where the thioether compounds are to be used as plasticizers, the thioether compounds should have boiling points high enough to permit their compounding in the normal manner on mills, etc. where the processing temperatures may be higher than about 100° C. Although low molecular weight thioether compounds of about 150 molecular weight, such as dithia-octane, dithia-nonane and dithia-hexane are fluid and can be used where the compounding temperature is relatively low, the higher molecular weight, higher boiling liquid or semi-solid thioether compounds are preferred as plasticizers where the plasticizer is added by milling, etc. Hence, the thioether compound used for this purpose should have molecular weights in excess of 150 and usually up to about 500 or 1000 or have a boiling point of 120° C. and higher.

It should be appreciated that this invention can be used to produce products useful for other purposes than as plasticizers. In fact, the very high molecular weight thioether compounds, i.e., those having molecular weights in excess of about 500, can be cured according to this invention to produce new plastic and elastomeric materials. For example, a polyunsaturated polymer, such as a liquid or solid polydienes, for example, polybutadiene, polyisoprene, polypiperylene, or copolymers of these monomers with other monomers, can be treated with organic mercaptans, preferably alkyl mercaptans, to form chemical adducts containing pendant thioether groups. Then reaction mixtures comprising these chemical adducts, epoxy compounds, and acids can be formed by any of the usual mixing techniques. These reaction mixtures, if they are sufficiently viscous, can be employed as caulking compositions which will cure at room temperature or at elevated temperatures to give excellent seals. Alternately, some of these compositions may be used as adhesives, fabric coatings, tank linings, and films.

Where the reaction mixture is to be cured using an epoxy reagent containing only a single epoxy group, the acid material should be at least difunctional to yield the best results. By difunctional acid is meant that one mole of acid is able to neutralize two equivalents of a base such as potassium hydroxide. The proportions of each ingredient in the final mixture may be varied over a wide range. The actual levels used are dependent upon the properties desired in the final product. In our preferred embodiment, the chemical equivalents of acids are equal to or greater than the chemical equivalents of epoxide, although a lower ratio can be used as shown in Example 4 where the ratio varies from about 0.5 to 3.0 and higher. When using a high molecular weight rubbery polymer such as those disclosed in U.S. patent application Serial No. 543,360, filed Oct. 28, 1955, by Pierson et al., the range of approximately 0.02 to 0.05 chemical equivalent of epoxide per 100 grams of polymer will yield cured products having elastomeric rubbery properties. Higher levels of epoxide up to 2 or even 3 and higher equivalents per 100 grams of polymer will yield products of a leathery or even a brittle nature. Not only the proportion of epoxide but the nature of the epoxide material and the acid used will influence the properties of the final product and the temperature at which the desired reaction will occur.

Other rubber compounding ingredients, such as carbon black, clay, zinc oxide and finely divided silicas may be included in the compounding recipe, keeping in mind that the combination of ingredients including the ingredients containing the essential groups must have sufficient free acid, organic in nature, so that there will be about 0.2 and preferably one or more chemical equivalents of acid per chemical equivalent of epoxide in the mixture. The sequence of addition and mixing of the various ingredients as well as the temperature of the mixture during its preparation should be adjusted to prevent pre-reaction of a portion of the ingredients or precure of the total mixture from occurring. Therefore, it is desirable to mix the thioether containing compound with the acid and other ingredients and then to add the epoxy compound at a temperature sufficiently low to prevent precuring.

It should be appreciated that the other compounding ingredients such as the reinforcing agent, for example, carbon black and finely divided silicas can be used in varying amounts, i.e. about 5 to 100 parts or more per hundred parts of the thioether compound but preferably the amount is from about 25 to 65 parts.

Although any organic acidic compound may be used in this invention, it is desirable that they be compatible in the mixture containing at least one epoxy compound. It should be appreciated that this requirement for compatibility is not an absolute necessity unless it is desired or required that the product of the reaction of the thioether compound with the epoxide be of uniform consistency. Where the ionization constant at about 25° C. of the organic acidic compound is less than about $1 \times 10^{-10}$, the cure time may become excessive or require the use of very high curing temperatures. Where the organic acidic compounds have ionization constants between about $1 \times 10^{-10}$ and $1 \times 10^{-5}$, it is usually more desirable to use elevated temperatures to speed up the reaction of the mixture of the epoxy compound, the thioether compound and the organic acidic compound. On the other hand, those strong acids and anhydrides having ionization constants of from about $1 \times 10^{-5}$ to $1 \times 10^{-3}$ usually effect the desired reaction at room temperature (50° F. to 80° F.) in a matter of hours.

Representative classes of organic acidic compounds useful in this invention are the organic acids such as the monocarboxylic and their anhydrides, dicarboxylic and their anhydrides, higher carboxylic acids and their anhydrides, and miscellaneous acids such as the novolac resins and organic acid ion-exchange resins. These carboxylic acids and anhydrides can be aliphatic, cycloaliphatic and aromatic as well as saturated and unsaturated.

Representative examples of suitable organic anhydrides for use in this invention are those anhydrides having from about 2 to 20 carbon atoms and higher. Representative examples of these anhydrides are maleic, succinic, dodecenyl succinic, tetrapropenyl succinic, phthalic pyromellitic, adipic, acetic, butyric, etc. Also, it should be appreciated that these anhydrides do not have ionizable hydrogens but are capable of forming acids which have ionizable hydrogens when reacted with water. Representative carboxylic acid or acidic materials for use in this invention are those acids having from about 1 to 20 carbon atoms and higher. Representative acids are phthalic, stearic, salicylic, pyromelittic, adipic, succinic, oleic, propanoic and benzoic. Even such miscellaneous acidic materials as phenols and chloro- or nitro-phenols, mercaptans such as dodecyl mercaptan and low molecular weight phenolformaldehyde resins, such as Amberol ST-37 sold by Rohm & Haas Company may be used. Saccharin and hydroquinone can be used, too.

Although the acids used in this invention are referred to as activators for the reaction of an epoxide material with compounds containing active thioether groups, it is not intended by the use of the word "activator" to limit the invention to any particular mechanism or theory of operation. But the term "activator" is merely used in a general sense in recognition of the observed fact that the presence of an acidic material is required to obtain the desired reaction. In one sense the acidic material may be regarded as a supplementary participant in the reaction of the epoxy compound and the thioether containing compound.

The thioether containing compounds of this invention can be low molecular weight liquid compounds, intermediate molecular weight viscous or solid materials, or high molecular weight solid materials which can be either resinous or elastomeric in nature.

Representative examples of the low molecular weight thioether materials may be thought of as the mercaptan adducts of the olefins per se where the boiling point of the adduct is about 120° C. or higher. Normally, the liquid mercaptan adducts of these olefins should have a molecular weight in excess of 150 to reduce loss thereof during mixing. Representative monomeric olefins useful for the formation of these adducts where the organic mercaptan is preferably chosen to give an adduct boiling above about 120° C. are propylene, butylene, pentylene, hexylene, butadiene, isoprene, piperylene and related olefins, having from about 2 to 20 carbon atoms with the preferred ones having less than 10 carbon atoms. The low molecular weight unsaturated polymers, such as the dimer, trimer, tetramer and higher of the homo and copolymers of the diolefins may be used also to form thioether compounds by reaction with a mercaptan but it is not intended to limit the thioether compounds useful in this invention to any specific mode of preparation described herein.

The preferred polymeric materials to which this invention is directed are those elastomeric polymers whereas the polymer contains pendant thioether groups, i.e. as —SR radical attached to the carbon atoms of the polymers either of the main backbone or in a pendant chain, where R is a hydrocarbon radical such as alkyl or cycloalkyl. These polymers can be prepared by reacting organic mercaptans, usually aliphatic in nature (although the cyclo aliphatic, and heterocyclic mercaptains may be used), with a polydiene containing some unsaturation such as natural rubber or synthetic polymers such as the rubbery polymers prepared by the polymerization of conjugated diolefins, usually containing from 4 to 6 carbon atoms, or by the polymerization of these conjugated diolefins with a comonomer having a vinyl or vinylidene group. Also, it should be readily apparent that the number of thioether groups present in the adduct can vary within wide limits depending on the degree of unsaturation found in the polymer before and after adduction with the organic mercaptan. Thus, the mercaptan adduct may have as few as 1 to 2% of the double bonds originally present in the polymers saturated by the formation of thioether groups and again, a greater percentage of the unsaturation may be destroyed by adduction. Those polymers having from 30 to 90% of their double bonds destroyed by formation of thioether groups are particularly desirable for use where conjoint sulfur and epoxide curing systems are used. It should be appreciated that those mercaptan adducts having over 90% of the original unsaturation destroyed by formation of thioether groups are somewhat difficult to cure with sulfur curing systems. Hence, the curing system of this invention offers specific advantages with these adducts relative to the sulfur curing system.

Methods of producing these elastomeric addition products are described in copending application Serial No. 543,360, filed Oct. 28, 1955 and U.S. Patent No. 2,556,856. By these methods at least some of the double bonds present in a polymerized polymer, preferably present in the form of a latex, are reacted with a mercaptan. These polymers are the homopolymers of conjugated diolefins having preferably from 4 to 6 carbon atoms, and the copolymers of conjugated diolefins having preferably from 4 to 6 carbon atoms and at least one monomer containing a vinylidene group copolymerizable with said diolefin. These polymers or copolymers are reacted preferably with at least one aliphatic mono-mercaptan having from 1 to 6 carbon atoms, although the aliphatic mercaptan may contain 20 or more carbon atoms.

One type of polymer to which this invention pertains may be said to be mercaptan adducts of diene resins or rubbers such as synthetic rubber or natural rubber in which the mercaptan is reacted with or saturates at least some of the double bonds of the diene rubber to form a mercaptan adduct which has an —S—R group attached to some of the carbon atoms of the polymer molecule where R is the organic part of the mercaptan such as alkyl, cycloalkyl, aryl or heterocyclic. R preferably has about 1 to 6 carbon atoms and is alkyl or cycloalkyl, although for some purposes R may contain 20 carbon atoms or more. Also, the number of —SR groups present in the polymer may vary depending on the amount of unsaturation satisfied by addition of mercaptan. Hence, as little as one percent to all the unsaturation may be satisfied by mercaptan addition. Normally, the degree of saturation varies from 10% to 99% with those having from 80 to 100% of their unsaturation satisfied, being especially preferred where good resistance to ozone is desired.

The point of attachment of the —S—R group to the polymer is determined by the location of the double bonds. For example, the polymerization of diolefins, for instance, isoprene, with certain catalyst systems may produce polymers which contain at least about 20% trans-content and also may have a high percentage of pendant vinyl or ethylenic groups attached to the main polymer chain or backbone while other catalysts will produce polymers having a very high percentage of the double bonds in the polymer chain or backbone, for instance, the high cis polydienes, and very few pendant vinyl or ethylenic groups. Thus, it should be evident to the skilled chemist that the ratio of pendant double bonds to backbond double bonds can vary within extremely wide limits.

This difference in the location of the double bond is of moment for it determines where the —S—R group is attached to the polymer, i.e. whether the —S—R group formed from the mercaptan is attached to a carbon atom in the polymer backbone per se or to a carbon atom in the pendant chain to produce thioether groups attached directly to a carbon atom in the polymer backbone or to a carbon atom in the pendant chain.

Another well-known class of chemicals to which this invention is applicable is the polymers of vinyl alkyl thioethers and vinyl cycloalkyl thioethers. These polymers can be made in wide molecular weight ranges and can have intrinsic viscosities from about 0.2 up to 3 and higher depending on the degree of polymerization.

Representative examples of the monomers useful for preparing these thioether polymers are vinyl methyl thioether, vinyl ethyl thioether, vinyl propyl thioether, vinyl butyl thioether, vinyl pentyl thioether, vinyl hexyl thioether, vinyl octyl thioether, and related vinyl alkyl thioethers where the alkyl radical contains preferably from 1 to 10 carbon atoms but can contain as many as 18 or more carbon atoms. Other representative monomers of this type are the vinyl cycloalkyl thioethers where the cycloalkyl radical has 5 or 6 carbon atoms, i.e. cyclopentyl and cyclohexyl and related substitute radicals.

It should be appreciated that the vinyl radical of the monomers of the vinyl alkyl thioether and the vinyl cycloalkyl thioether can be replaced with other unsaturated radicals, for instance, allyl, and these unsaturated thioether monomers can be polymerizable to yield polymers having pendant thioether groups which are reactable with epoxy compounds in the presence of acidic activators.

Also, it should be appreciated that liquid alkenyl alkyl thioethers and alkenyl cycloalkyl thioethers may be used as plasticizers and then be immobilized by reaction with an epoxy compound in the presence of an acidic activator.

The epoxy resin compounds employed in the process of this invention are well known. The general characteristic of this class of material is the presence of epoxy groups, which are of the formula

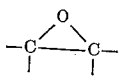

Ordinarily, epoxy resins contain a plurality of terminal epoxy groups. Usually epoxy resins are of moderately high molecular weight, containing more than 10, and usually more than 20 carbon atoms per molecule, although in this invention epoxy compounds containing fewer carbons may be used.

Epoxy resins are typically prepared by reaction of a polyfunctional epoxy compound with a compound containing two or more hydroxy radicals, producing epoxy resins comprising one or more ether linkages, joining organic radicals and terminating in epoxy groups.

The members of a preferred class of epoxy resins for use in the process of this invention are the products of reactions of polyfunctional epoxy compounds with aromatic polyhydric phenolic compounds. The polyfunctional epoxy compound used in this connection may be a diepoxide, distinguished from the class of epoxy resins by its relatively low molecular weight, illustrative of which are diepoxybutadiene, and bis (2,3-epoxy-2-methylpropyl) ether. More usually, the polyfunctional epoxy compound is a haloepoxy compound, most commonly, epichlorhydrin. Reaction of epichlorhydrin, for example, with an aromatic polyhydric phenolic compound results in the formation of a polymer containing ether linkages between arylene radicals derived from the initial aromatic polyhydric compound and hydroxy-alkylene radicals derived from the initial haloepoxy compound, the polymers terminating in epoxyalkyl radicals. The aromatic polyhydric compound may comprise a monocyclic phenol such as a resorcinol, a polycyclic phenol such as p,p¹-(dihydroxy)-bisphenol, or phenolic resin such as a phenolformaldehyde resin. In particular, there are preferred in the process of this invention, epoxy resins derived from the reaction of epichlorohydrin and bisphenols. These bisphenol derived resins correspond to the general formula:

A specific class of epoxy resins useful in this invention are the allyl glycidyl ether polymers of varying molecular weights.

Epoxy groups can be introduced into organic molecules by treatment of an aliphatic double bond with an appropriate oxidizing agent. Examples of epoxy compounds of this nature are the epoxidized polydienes such as epoxidized polybutadiene, epoxidized polyisoprene, epoxidized polypiperylene, epoxidized fats and oils such as soybean oil, etc. The above epoxidized compoundss can and frequently do contain more than two epoxy groups per molecule. For example, the number of epoxy groups can vary from a single epoxy group to 2 to 5 or even up to 10 or more per molecule.

In general, aliphatic chains produce more flexible resins than aromatic, and mixed aliphatic and aromatic chains may alternatively be introduced into an epoxy resin, using the aforedescribed procedures, producing resins of modified properties.

As mentioned above, epoxidized cycloaliphatic compounds such as a diepoxide of diethylene glycol bisdihydrodicyclopentadienyl ether, are also comprised within the class of epoxy resins. Other feasible variations in epoxy resin structure will be known to the art. This invention contemplates the use of any of the variety of epoxy

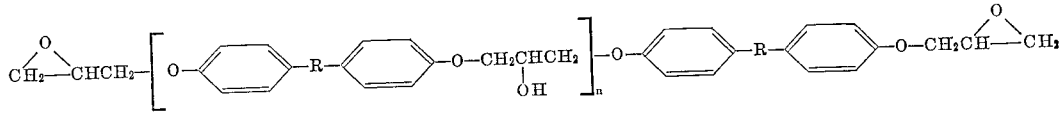

where $n$ is an integer, including zero and where R is a linking radical selected from —O— and

$y$ being selected from H and $C_xH_{2x+1}$ and $x$ is an integer of from 1 to about 16. Of course, the phenylene radical may or may not be substituted with a noninterfering substituent, such as a halogen atom or a lower alkyl radical containing from 1 to 6 carbon atoms. Illustrative of bisphenols which may be employed to produce resins of the above formula, giving rise to the arylene radical represented by the group

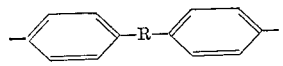

are, for example, p,p¹-oxybisphenol, p,p¹-methylene bisphenol, 2,2-bis(4-hydroxyphenol) propane, 2,2-bis(4-hydroxy-2-methylphenyl) propane, 2,2-bis(2-t-butyl-4-hydroxyphenyl) propane, 2,2-bis(2,5-dimethyl-4-hydroxyphenyl) propane, 2,2-bis(2-chloro-4-hydroxyphenyl) propane, 2,2-bis(2-bromo-6-fluoro-4-hydroxyphenyl) propane, 1,1-bis(4-hydroxyphenyl)ethane, 1,1-bis(4-hydroxyphenyl)isobutane, 1,1-bis(2-isopropyl-4-hydroxyphenyl) isobutane, 2,2-bis(4-hydroxyphenyl)butane, 4,4-bis(4-hydroxyphenyl)heptane, 1,1-bis(4-hydroxyphenyl)dodecane, and 2,2-bis(4-hydroxyphenyl)hexadecane. Resins prepared from epichlorohydrin and 2,2-bis(4-hydroxyphenyl)-propane, are represented by the general formula.

Another class of epoxy resins commercially available and useful in the present process comprises aliphatic epoxy resins. Compounds of this nature may, for example, be prepared by a process analogous to that employed in preparing an epoxy resin from a bis-phenol, with the substitution of an aliphatic polyol for the aromatic hydroxy compound. As illustrative of epoxy resins of this class may be mentioned reaction products of an epoxy group source such as epichlorohydrin with aliphatic polyols such as triethylene glycol, 1,4-butylene glycol, hexamethylene glycol, octaethylene glycol, glycerol, and sorbitol.

resins conventionally used in the industry for the production of resinous materials by curing processes.

It will be understood that in commercial epoxy resins, the integer $n$, representing in the above formulae the number of times the repeated unit of the polymer chain recurs, will vary from molecule to molecule. In general, any commercial resin will represent a mixture of resins of varying chain lengths corresponding to a varying number of repeated units. Compared to other widely-used resin products, the epoxy resins are of relatively low molecular weight, and at least in part of the molecules, $n$ may even be zero. Such resins are nevertheless designated as polymeric, however, with reference to the duplication of chain units in the molecule, and to the at least partial content of polymeric molecules usually present. Furthermore, though ideally the resin molecule, as represented by the above-illustrated formulae, contains two epoxy groups per molecule, in practice it is found that the resinous products have a varying average number of epoxy groups per molecule. The epoxy group content of such resins is conventionally expressed as the epoxide equivalent, which refers to the grams of resin containing a gram equivalent of epoxide. The epoxide equivalent of a commercial resin is generally expressed as a range, such as 125–175, 150–200, etc. In the practice of this invention, epoxy resins having low epoxide equivalents, below 250, are preferred because of the lower viscosity of such resins, although higher equivalents offer advantages where viscosity is not a factor.

In accordance with one embodiment of this invention, the epoxy resin employed consists of a mixture of a polymeric epoxy resin and a monomeric epoxy compound. By a polymeric epoxy resin is here meant, as pointed out above, epoxy resins as described above, including resins of the above formulae where $n$ is zero. By a monomeric epoxy compound is here meant epoxy compounds of low molecular weight and characteristically containing a single epoxy group. As used in the present specification, the term epoxy resin refers either to a polymeric epoxy resin alone, or to a mixture of such polymeric epoxy resin with a monomeric epoxy compound. The use of an admixture of such a monomeric epoxy compound has the advantage that the viscosity of the epoxy resin is reduced. It is thus possible to use higher molecular weight and more viscous polymeric epoxy resins in the process of the invention while maintaining a workable viscosity in the mixture in most cases. Although monomeric epoxy compounds may be used in the process, if desired, the low viscosity polymeric epoxy compounds are generally preferred. Illustrative of epoxy compounds which may be employed in this connection are aliphatic epoxy ethers such as allyl glycidyl ether corresponding to the formula

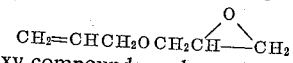

aromatic epoxy compounds such as phenyl glycidyl ether, glycidyl benzene and styrene oxide (1,2-epoxyethylbenzene) and hydroxyalkyl glycidyl ethers such as 2-hydroxyethylglycidyl ether.

The epoxy compounds may be monomeric or polymeric in nature as shown by the following list of representative epoxy materials:

TABLE 1

| Code | Epoxide | Supplier | Trade Name |
|---|---|---|---|
| | MONOFUNCTIONAL MATERIALS | | |
| A | Phenyl glycidyl ether | | |
| B | Octylene oxide | | |
| C | $C_{16}$-$C_{18}$ olefin oxide | | |
| D | Styrene oxide | | |
| E | Allyl glycidyl ether | | |
| F | Propylene oxide | | |
| | POLYFUNCTIONAL MATERIALS | | |
| G | Polyallylglycidyl ether (PAGE) | | |
| H | Vinylcyclohexene dioxide | Shell Chem | |
| I | Dicyclopentadiene dioxide | Union Carbide | Unox Epoxide 206. |
| J | 3,4-epoxy-6-methylcyclohexylmethyl-3,4-epoxy-6-methylcyclohexanecarboxylate | do | Unox Epoxide 207. |
| K | Dipentene dioxide | do | Unox Epoxide 201. |
| L | Epichlorohydrin-glycerine reaction product | FMC* | |
| M | Epichlorohydrin-1,4-butanediol reaction product | Shell Chem | Epon 812. |
| N | Epichlorohydrin-bis-phenol-A reaction product | Ciba Chem | Araldite RD-2. |
| O | Similar to N except higher molecular weight | Dow Chem | DER-332. |
| P | Similar to N except higher molecular weight | Shell Chem | Epon 828. |
| Q | Epoxidized soya bean oil | do | Epon 1001. |
| R | Epoxidized polydiene | Swift & Co | Epoxol 7-4. |
| S | 1,3-bis [3(2,3-epoxy propoxy) propyl] tetramethyl disiloxane | FMC* | Oxiron 2000. |
| T | Bis-epoxydicyclopentyl ether of ethylene glycol | Dow Corning | Syl Kem 90. |
| U | Epoxylated novalacs (phenolformaldehyde product) | Rohm & Haas | AG-13E. |
| | | Dow | DEN 438. |

*FMC—Food Machinery and Chemical Corporation.

The rates of cure can be controlled by the nature and amount of the activators used as well as by controlling the number of functional groups on the activators and the epoxy compounds. For example, if fast cures are desired, the activators should be highly compatible with the other ingredients of the reaction mixture as well as being strong polyfunctional acids, preferably organic carboxylic acid or anhydrides. In this regard, it is well to indicate that relatively high molecular weight monofunctional carboxylic acid such as stearic acid gives very slow cures at room temperature, i.e., about 70° F. At elevated temperatures, say 200 to 300° F., stearic acid gives better cure rates and cured products than when cured at room temperature. On the other hand, the difunctional acids, such as phthalic acid or anhydride, cause very fast cures at room temperature—usually only a few hours are required to obtain a satisfactory cure. In fact, salicylic acid is such a fast activator that it tends to cause scorching during the milling operation. Thus, with the very active activators, such as salicylic acid, a strong polyfunctional organic acid, it is desirable to cool the mill during mixing or to use these very active activators with the fluid thioether compounds and the fluid epoxy compounds where the mixing can be accomplished with a minimum amount of heat input.

In this specification and claims the various ingredients in the compounding recipes are expressed as parts per 100 parts (phr) of the polymer or the thioether compound. The term "swell volume" is the ratio of the volume of the swollen rubber, after 48 hours contact with excess benzene at 25° C., to the volume of the dried rubber. The swell volume as reported herein has been corrected for the volume of filler, if any, present in the rubber, i.e., on a filler-free basis. The solubility values are expressed as percent by weight solubility of the vulcanizate on a filler-free basis after standing in benzene at 25° C. for about 48 hours. The inherent viscosities of the polymer were determined at 30° C. on a solution consisting of 0.1% by weight of polymer dissolved in benzene containing 0.1% of the antioxidant, phenyl beta naphthylamine, and the values obtained are expressed as deciliters per gram.

To illustrate the manner in which the invention may be carried out, the following examples are given. It is to be understood, however, that the examples are for the purpose of illustration and the respective embodiments of this invention are not to be regarded as limited to any of the specific materials or conditions recited therein. Unless otherwise indicated, parts and percentages described in the examples are by weight.

*Preparation of thioether-containing polymer*

EXAMPLE A

PREPARATION OF A LIQUID THIOETHER POLYMER

A low molecular weight viscous liquid polymer possessing pendant thioether groups was prepared by a two-step procedure. In the first step, polybutadiene was prepared by conventional emulsion polymerization of butadiene using the following recipe on a parts by weight basis:

| | |
|---|---|
| Butadiene | 100 |
| Water | 200 |
| Fatty acid soap | 5 |
| Potassium persulfate | 0.3 |
| t-Dodecyl mercaptan | 4 |

The polymerization was carried to 77% conversion in 16 hours at 50° C. The unreacted butadiene was removed from the latex by vacuum stripping at temperatures up to 30° C.

The second step of the process was the preparation of the liquid polymer containing pendant thioether groups. This step of the process was performed by placing a sufficient amount of the latex in an 8-liter stainless steel pressure bomb to give 500 parts of polybutadiene on a dry basis. Then 495 parts of methyl mercaptan was added to the pressure bomb. About 10 parts of the mercaptan was evaporated to purge the air space in the bomb. The bomb was sealed and then was shaken to mix the contents of the bomb. Later the bomb was placed near a cobalt 60 radiation source and allowed to remain in this position at room temperature until the bomb had been exposed to 5 megarads of gamma radiation where a megarad represents one millionth of the amount of radiation required to impart 100 ergs of energy per gram of material. This radiation initiated the adduct reaction whereby the methyl mercaptan added to the double bonds of the polybutadiene. The excess mercaptan was removed by stripping and after addition of 1 pt. PBNA (phenyl beta naphthylamine, antioxidant) the latex was coagulated by successive additions of an aqueous solution of sodium chloride (about 12% by weight), and 3% sulfuric acid. The coagulum obtained by this acid-salt treatment was water washed and then it was dried in a vacuum oven at about 50° C. The dried product from the mercaptan treatment was a viscous liquid at room temperature having an inherent viscosity of 0.23. Analysis of this product indicated that methyl mercaptan had reacted with 92.5% of the double bonds present in the polybutadiene to form thioether groups.

EXAMPLE B

A high molecular weight, rubbery, polymer possessing pendant thioether groups was prepared from a high molecular weight polybutadiene. This polybutadiene was produced by the procedure described in Example A except only 0.3 part t-dodecyl mercaptan was used in the polymerization recipe.

This polybutadiene latex containing 100 parts of rubber hydrocarbon was placed in a closed reaction vessel equipped with a mechanically driven agitator. The vapor space of the vessel was evacuated and 108 parts of methyl mercaptan added. The agitator was started and a dilute stream of p-menthane hydroperoxide was added slowly to initiate the adduct reaction. A total of 2 parts hydroperoxide was added over a period of 5 hours during which time the temperature of the reaction mixture was maintained between 100 and 120° F.

Samples were taken at various times and solids content determined until the desired degree of saturation of the double bonds were obtained. The residual uncombined methyl mercaptan was removed by steam stripping. The reaction product formed by the addition of methyl mercaptan at the double bonds of the polybutadiene was isolated from its latex by slowly pouring the latex into a vigorously agitated dilute solution of magnesium sulfate containing 5% sodium hydroxide based on the weight of magnesium sulfate. Then the coagulum was washed with water and was dried at a temperature of 150° F. in a circulating air oven. The addition product isolated by the magnesium sulfate/sodium hydroxide coagulation had 95.8% of the available double bonds therein saturated by the addition of methyl mercaptan. This product had a Mooney (ML 212° F-4) of 60 as determined by ASTM Method D927–53T.

EXAMPLE C

Another methyl mercaptan adduct of polybutadiene was prepared in substantially the same manner as in Example B except the adduct was isolated by the salt-acid coagulation procedure described in Example A. This adduct was 93.6% saturated as determined by sulfur analysis.

By the salt-acid coagulation procedure the fatty acid soap used as the emulsifier in the polymerization system is converted to the fatty acid, most of which remains in the coagulated adduct rubber.

EXAMPLE D

A butadiene-styrene copolymer was prepared according to the emulsion procedure described above in Example B. The weight ratio of butadiene to styrene was 75/25 in this polymer. The butadiene-styrene latex was treated with ethyl mercaptan to form the ethyl mercaptan adduct of this butadiene-styrene polymer. The resulting adduct was 61% saturated and had a Mooney (ML 212° F-4) of 50.

EXAMPLE E

An n-butyl mercaptan adduct was prepared by treating polybutadiene with n-butyl mercaptan. The polybutadiene was prepared by the procedure described in Example B. Azodiisobutyronitrile (1 part) was used as the initiator of the adduct reaction. This was mixed into the polybutadiene latex after which the n-butyl mercaptan (150 parts) was added. Prior to the addition of the mercaptan to the reaction vessel, the vapor space in the vessel was purged with nitrogen to remove the air. The vessel was sealed and the reaction mixture was maintained at 122° F. for 20 hours while being agitated. The excess mercaptan was removed by steam stripping and the latex was coagulated by the salt-acid procedure described in Example A. Sulfur analysis indicated this adduct was 82% saturated.

EXAMPLE F

Polymer F is an n-dodecyl mercaptan adduct of a butadiene-styrene copolymer which is 69% saturated. This copolymer was prepared by the procedure used in Example D, except the adduct reaction was initiated with 2 parts of potassium persulfate instead of p-menthane hydroperoxide.

EXAMPLE G

A sample of polybutadiene from Example B was reacted with methyl mercaptan to form an adduct which was only 6% saturated.

EXAMPLE H

An 80/20 butadiene-acrylonitrile rubbery copolymer was formed by emulsion polymerization and then an adduct with methyl mercaptan was formed by the procedure used in Example A. The resulting adduct was 78% saturated.

*Examples using the thioethers*

EXAMPLE 1

The liquid polymer adduct from Example A was reacted with the following epoxides using dodecenyl succinic anhydride (abbreviated as D.S.A.) as the activator to promote the reaction between the thioether groups of the polymer and the epoxide. The results of these reactions are shown in the following table for the indicated reaction mixtures of D.S.A. and epoxide.

TABLE I

| Run No. | Reaction Mixture* | | Time | Temperature (° C.) | Solubility (percent) |
|---|---|---|---|---|---|
| | D.S.A. | Epoxide | | | |
| 1 | 22.8 | 12 | 13 days | Room | 26 |
| 2 | 26.5 | 20 | 13 days | Room | 14 |
| 3 | 31.8 | 20 | 13 days | Room | 15 |
| 4 | 31.8 | 20 | 20 hours | 115 | 20 |

*Parts of D.S.A. and parts of epoxide per 100 parts polymer adduct by weight.

Vinylcyclohexene dioxide was the epoxide used in Run No. 1 and Epoxide M, a low molecular weight reaction product of epichlorohydrin and 1,4-butane diol, was used in Runs 2, 3 and 4. In Runs 1 and 2 the ratio of chemical equivalents of acid to epoxide is equal to 1; in Examples 3 and 4 the ratio is 1 to 1.2.

Since the acidic activator and the epoxides used in these experiments were liquids and the polymer adduct from Example A was a viscous fluid, the resulting mixture was fluid and could be stirred readily with a spatula. After curing the indicated time, the resulting mixtures were rubbery materials that could be handled without sticking to one's fingers and would return to their original shapes upon release after being stretched to several times their original lengths. The solubility data indicate a large proportion of the original mixture had chemically combined to yield a cured product.

EXAMPLE 2

A liquid poly (vinyl-n-butyl-thioether) with a dilute solution viscosity of 0.2 was cured in the following manner. Separate benzene solutions of 100 parts poly (vinyl-n-butyl thioether), 10 parts of polyallylglycidyl ether and 28 parts of stearic acid were prepared. The solutions were mixed and the benzene removed by evaporation at room temperature. The residue, a thin film, was heated for 16 hours at 155° F. for curing. When the cured film was placed in an excess of benzene, only 30% of the cured film was soluble and the insoluble portion had a swelling volume of 16.6.

Other poly (vinyl alkyl thioethers) such as poly (vinyl dodecyl thioether), poly (vinyl methyl thioether) and poly (vinyl octadecyl thioether) may be cured by this method to obtain benzene insoluble polymers.

EXAMPLE 3

To determine the effect of fillers in a compounding recipe for curing the thioether compounds of this invention, the polymer adduct of Example H and a very high molecular weight epichlorohydrin-bis phenol-A reaction product (sometimes referred to herein and identified in the Table of Commercial Epoxides as epoxide P) were compounded with various fillers and cured. The curing recipe used comprised: 100 parts polymer adduct, 12 parts epoxide P, 2 parts phthalic anhydride and 50 parts of filler. The specific filler used is indicated after each run number in Table II.

TABLE II

| Run No. | Filler | Cure Conditions | Tensile, p.s.i. | Elongation at Break, Percent |
|---|---|---|---|---|
| 5 | Carbon Black (HAF) | 60 min. at 300° F | 3,065 | 535 |
| 6 | ----do---- | 15 days at room temp | 3,085 | 335 |
| 7 | HiSil, X-303* | 60 min. at 300° F | 1,830 | 610 |
| 8 | ----do---- | 15 days at room temp | 3,175 | 385 |

* Acidic silica filler from Columbia-Southern Chemical Corporation.

For the control run without a filler, the tensile was 380 pounds per square inch (p.s.i.) and the elongation at break was 565%. These fillers improve the tensile strength several fold.

EXAMPLE 4

To determine the effect of varying amounts of acid on the physical properties of the cured stocks, 100 parts of the polymer adduct from Example B was compounded at various acid levels with a high abrasion furnace type carbon black, sometimes referred to herein as carbon black (HAF). The polymer adduct was compounded on a mill using normal compounding techniques with 50 parts carbon black and 12 parts epoxide P. This amount of epoxide P corresponds to 0.0246 chemical equivalents of epoxy groups for each 100 grams of polymer. This masterbatch was divided into seven equal portions, then different amounts of phthalic anhydride was added to each, as indicated in Table III. The phthalic anhydride was added to this masterbatch by the cold, rubber mill mixing technique and each mixture was removed from the mill in the form of a sheet approximately 0.04 inch thick. The sheets were allowed to stand at room temperature for 23 days. Then portions of the sheets were used to run certain tests. The results of these tests are shown in Table III:

TABLE III

| Run No. | Ratio* Acid/ Epoxide | 300% Modulus, p.s.i. | Tensile, p.s.i. | Elongation, percent at break | Solubility, percent |
|---|---|---|---|---|---|
| 9 | 0.55 | 1,570 | 1,950 | 430 | |
| 10 | 0.81 | 2,210 | 2,900 | 425 | 24.1 |
| 11 | 0.96 | 2,240 | 3,050 | 435 | 13.8 |
| 12 | 1.10 | 2,410 | 3,320 | 410 | 14.7 |
| 13 | 1.22 | 2,585 | 3,370 | 410 | 12.0 |
| 14 | 1.62 | 2,775 | 3,520 | 410 | 10.7 |
| 15 | 2.76 | 2,620 | 3,455 | 415 | 8.0 |

*Ratio of chemical equivalents based on an equivalent weight of 74 for phthalic anhydride and an equivalent weight of 488 for epoxide P.

These test results indicate that better tensile values and lower solubility values are obtained when the equivalents of acid are somewhat greater than the equivalents of epoxide, with optimum values being obtained at ratios of about 1.1 to about 3. Appreciable cure is obtained even at 0.55 equivalents of acid for each equivalent of epoxide. Thus, lower values may be used if optimum cures are not desired.

EXAMPLE 5

The adduct polymer from Example H was compounded with epoxide P, phthalic anhydride and various fillers, the nature of the filler is indicated with the tabulated test data for each run.

The curing recipe used in this study was:

Adduct of the copolymer of butadiene/acrylonitrile -- 100
Epoxide P ------------------------------------------- 12
Phthalic anhydride ---------------------------------- 2
Filler, when used ----------------------------------- 50

Test data on samples press cured at 300° F. for 60 minutes:

| | Run Number | | |
|---|---|---|---|
| | 2070 | 2071 | 2068 |
| | Type Filler | | |
| | Carbon Black (HAF) | Silica X-303 | None |
| Tensile, p.s.i. | 3,065 | 1,830 | 380 |
| Elongation | 535 | 610 | 565 |
| 300% modulus | 1,250 | 725 | 135 |
| Swell volume | 4.9 | 6.5 | 6.7 |
| Solubility, percent | 10.7 | 16.1 | 10.4 |

EXAMPLE 6

The mercaptan adduct polymer of Example C was used in this example. This study was made to determine the effects of various acidic materials on the rate of cure and on the cured properties of this methyl mercaptan adduct when compounded with 12 parts of epoxide P for each 100 parts of adduct, i.e. at approximately 0.027 equivalent epoxy groups per 100 grams of adduct. The result of this study is shown in Table IV:

TABLE IV

| | Run No. | | | |
|---|---|---|---|---|
| | 1942 | 1939 | 1941 | 1937 |
| | Acid | | | |
| | Phthalic Anhydride | Phthalic | Salicylic | Stearic |
| Acid amount, phr | 2 | 2.2 | 1.8 | 7.5 |
| Press cured at 300° F. for 60 minutes: | | | | |
| Tensile | 390 | 450 | Precured | 570 |
| Elongation | 610 | 795 | | 915 |
| 300% modulus | 120 | 115 | | |
| Room temp. cured for 2 days: | | | | |
| Swell volume | 12.2 | High | 8.6 | 20.5 |
| Solubility, percent | 19 | 92 | 17 | 30.8 |
| Room temp. cured for 6 days: | | | | |
| Swell volume | 8 | 37.5 | 7.4 | 10.2 |
| Solubility, percent | 11.2 | 58.3 | 13.2 | 15.8 |

EXAMPLE 7

One hundred parts of the methyl mercaptan adduct of Example B was compounded on the mill with varying amounts of phthalic anhydride, 50 parts carbon black (HAF) and sufficient epoxide P to give a final composition containing 0.027 equivalents of epoxide P per 100 grams of adduct. The amount of phthalic anhydride added to the adduct varied from batch to batch. The various batches were cured and tested. The cure time and test results are shown in Table V for various levels of phthalic anhydride.

EXAMPLE 8

The methyl mercaptan adduct from Example B was compounded according to the following recipe to form a masterbatch:

Adduct _____ 100
Carbon black, HAF _____ 50
Epoxide P _____ 12

Then various acids were milled into aliquots of this masterbatch in the amount indicated in the following table and then these samples were cured. The test data on these cured samples are as shown in the table for the following cure conditions:

TABLE V

| | Run No. | | | | | | |
|---|---|---|---|---|---|---|---|
| | 1999 | 2052 | 2051 | 2050 | 2049 | 2048 | 2047 |
| Phthalic anhydride, phr | 1.0 | 1.5 | 1.75 | 2 | 2.25 | 3 | 5 |
| Press cured at 300° F. for 60 minutes: | | | | | | | |
| Tensile | 1,030 | 1,610 | 1,760 | 1,865 | 1,960 | 1,830 | 1,490 |
| Elongation, percent | 455 | 550 | 560 | 590 | 595 | 595 | 605 |
| 300% modulus | 810 | 905 | 915 | 940 | 1,025 | 950 | 780 |
| Swell volume | | 7.2 | 7.9 | 7.5 | 7.2 | 7.8 | 8.3 |
| Solubility | | 14.3 | 20.9 | 18.3 | 17.2 | 19.7 | 22.3 |
| Room temperature cure for 23 days: | | | | | | | |
| Tensile | 1,950 | 2,900 | 3,050 | 3,320 | 3,370 | 3,520 | 3,455 |
| Elongation, percent | 430 | 425 | 435 | 410 | 410 | 410 | 415 |
| 300% modulus | 1,570 | 2,210 | 2,240 | 2,410 | 2,585 | 2,775 | 2,620 |

These tensile values indicate good physical properties are obtained when about 0.6 to about 2.5 equivalents of acid are used for each equivalent of epoxide.

A room temperature cure and a press cure at 300° F. for 1 hour:

| Acids * | Press Cured | | | | Room Temp. Cured | | | |
|---|---|---|---|---|---|---|---|---|
| | Phr. | Tensile | Elongation | 300% Modulus | Days | Tensile | Elongation | 300% Modulus |
| TPSA | 4 | 2,150 | 600 | 980 | 14 | 2,175 | 425 | 455 |
| ST 137 resin | 6 | 1,235 | 650 | 360 | 23 | 825 | 635 | 670 |
| do | 12 | 1,310 | 695 | 540 | 15 | 1,850 | 460 | 1,160 |
| DSA | 4 | 2,365 | 635 | 955 | 23 | 2,970 | 495 | 1,945 |
| Phthalic anhydride | 2 | 1,865 | 590 | 940 | 23 | 2,320 | 410 | 2,410 |
| Salicylic | 1 | 790 | 630 | 485 | 14 | 2,950 | 245 | |
| Stearic | 7.5 | 1,820 | 445 | 1,740 | 14 | 2,565 | 445 | 1,740 |
| Phthalic | 2.2 | 1,600 | 610 | 745 | 14 | 2,325 | 420 | 1,860 |
| DDM | 6 | 400 | 655 | 300 | | | | |

* TPSA is a commercial product reported to be tetrapropenyl succinic anhydride. DSA is a commercial product reported to be dodecenyl succinic anhydride. ST 137 resin is Amberol ST 137 resin having a specific gravity of 1.04 supplied by Rohm & Haas and reported to be a resinous reaction product of phenol and formaldehyde. DDM is dodecyl mercaptan.

EXAMPLE 9

A hundred parts of the methyl mercaptan adduct of Example B was compounded with 12 parts of epoxide P and let stand at room temperature for 59 days to see if it would cure in the absence of an acid. This composition was still completely soluble in benzene after 59 days at room temperature.

Another batch of this adduct (100 parts) was compounded with 12 parts of epoxide P and 7.5 parts of stearic acid and let stand at room temperature for 59 days. After 59 days, only 16.5% of this material was soluble in benzene. The benzene insoluble portion of this cured product had a swell volume of 10. These test results indicate an acid activator is necessary for the epoxy compound to cure this adduct.

EXAMPLE 10

An acid free black stock was made by compounding 100 parts of the methyl mercaptan adduct of Example B with 50 parts of carbon black (HAF) and 10 parts epoxide P. An acid containing black stock was made by adding to the acid free black stock 6 parts of stearic acid for every 100 parts of adduct. Samples of these two black stocks were cured either at 300° F. for one hour in the press or by letting them stand at room temperature for the number of days indicated. The test results on these cured samples are shown in Table VI:

The test data on these two stocks clearly indicate an acid activator must be present even with the black loaded stock to obtain a cured product. Since these solubility and swell volume values are lower than the values obtained on the cured non-black stock of Example 9, carbon black may aid the cure.

EXAMPLE 11

A masterbatch was made using 50 parts carbon black (HAF) for each 100 parts of the mercaptan adduct of Example B. Then portions of this masterbatch were compounded on the mill with phthalic anhydride and an epoxy material in the amounts shown in Table VII. Some of these mill batches were divided into two parts, one part was cured in a press at 300° F. for one hour while the other part was allowed to cure at room temperature for the indicated number of days. The test data on these samples are shown in Table VII.

EXAMPLE 12

2,7-dithiaoctane, a liquid di(thioether), was mixed on a mol for mol basis, unless otherwise indicated, with a liquid acid, and liquid vinyl cyclohexene dioxide (VCHO$_2$). These mixtures were allowed to stand for seventy days at room temperature. The appearance of the mixture was noted immediately after mixing, at 10 days and at 7 weeks. The solubility in benzene and other

TABLE VII.—USE OF VARIOUS EPOXIDES AS CURATIVES

| | Runs* | | | | | | | | | | |
|---|---|---|---|---|---|---|---|---|---|---|---|
| | 2116 | 2117 | 2118 | 2114 | 2105 | 2024 | 2021 | 2006 | 1657 | 1661 | 1616 | 1620 |
| Phenyl glycidyl ether | 5.4 | 10.8 | 15 | | | | | | | | | |
| Olefin oxide of 16–18 carbons | | | | | | | | | | | | |
| Styrene oxide | | | | 15 | | | | | | | | |
| Oxiron 2000 | | | | | 15 | | | | | | | |
| EP 206 | | | | | | 4.43 | | | | | | |
| Epon 828 | | | | | | | 1.72 | | | | | |
| EP 201 | | | | | | | | 4.7 | | | | |
| Epoxol 7–4 | | | | | | | | | 10 | | | |
| Syl Kem 90 | | | | | | | | | | 10 | | |
| DER-332 | | | | | | | | | | | 5 | |
| Phthalic anhydride | 1.3 | 6.5 | 8.8 | 5.3 | 3 | 2.4 | 2.4 | 2 | 6 | 6 | 3 | 5 |
| Press cure 300° F. 1 hour: | | | | | | | | | | | | 3.5 |
| Tensile | 440 | 1,275 | 1,520 | 427 | 250 | 1,095 | 275 | 1,920 | 2,025 | 200 | 1,640 | 1,230 |
| Elongation | 750 | 640 | 665 | 660 | 855 | 620 | 850 | 605 | 580 | 680 | 600 | 515 |
| 300% modulus | 150 | 390 | 475 | 158 | 160 | 545 | 170 | 800 | 915 | 90 | 750 | 760 |
| Cured at room temp, days | | | | | | 25 | 25 | 22 | | | | |
| Tensile | | | | | | 1,740 | 1,995 | 3,195 | | | | |
| Elongation | | | | | | 515 | 595 | 605 | | | | |
| 300% modulus | | | | | | 1,065 | 975 | 800 | | | | |

*The amount of the curing agents used are expressed on a parts per hundred basis.

TABLE VI

| | Composition | | | |
|---|---|---|---|---|
| | Acid Free Stock | | Acid Stock | |
| | Cure Conditions | | | |
| | Press Cure | Room Temperature Cured for 31 days | Press Cure | Room Temperature Cured for 15 days |
| Solubility, percent | 100 | 66 | 11 | 6 |
| Swell volume, percent | | (¹) | 7 | 6.3 |
| Tensile, p.s.i | | | 1,360 | 1,915 |
| Elongation, percent | | | 525 | 400 |
| 300% modulus, p.s.i | | | 845 | 1,450 |

¹ Disintegrated.

solvents was determined after one month. The results of these tests are given in Table VIII:

From these test data, it is clearly evident that the use of an epoxy cure in conjunction with the usual sulfur cur-

TABLE VIII

| No. | Mixture | | | Appearance | | | Solubility 1 month |
|---|---|---|---|---|---|---|---|
| | Thioether | Epoxide | Acid | 1st day | 10 days | 70 days | |
| 1 | Dithiaoctane | VCHO₂ | Dimer acid | Like syrup | Slightly thicker | Thicker | Sol. in benzene. |
| 2 | ___do___ | VCHO₂ | Dimer* acid | Thicker than #1 | ___do___ | ___do___ | Do. |
| 3 | ___do___ | VCHO₂ | No acid | Like water | No change | No change | Do. |
| 4 | ___do___ | VCHO₂ | TPSA | ___do___ | Like syrup | Slightly thicker | Do. |
| 5 | ___do___ | VCHO₂ | TPSA* | ___do___ | A viscous gel | Solid gel | Partially sol. in benzene, MEK. |
| 6 | None | VCHO₂ | TPSA | ___do___ | Like water | Partially gelled | Sol. in benzene. |

*2 mols of acid.
Dimer acid is a liquid product of Emery Industries, Inc. which is reported to be the dimer of an unsaturated fatty acid of about 16 to 18 carbon atoms.
MEK is methyl ethyl ketone.

Although this low molecular weight dithioether did not produce a cured product insoluble in benzene, it did become less mobile and would offer greater resistance to migration.

The synthetic rubbers obtained by polymerizing butadiene, isoprene or mixtures of butadiene or isoprene with vinyl compounds such as styrene or acrylonitrile are well known. Also, these polymers and copolymers of the conjugated dienes, such as butadiene and isoprene have been reacted with organic mercaptans, such as the alkyl mercaptans to form a chemical adduct between the polymer and the mercaptan. This chemical addition results in the polymer having pendant thioether groups attached to one of the carbons that was formerly joined by the double bond. These mercaptan adducts may have especially good resistance to oxidation and especially good ozone resistance as well as good solvent resistance. These chemical adducts of the diene polymers and copolymers normally have been cured by either a sulfur or peroxide curing recipe. Examples 13 and 14 will illustrate the beneficial results obtained when the epoxy curing system of this invention is used conjointly with a sulfur cure to obtain a cured product having improved tensile strength and other physical properties.

EXAMPLE 13

A polybutadiene elastomeric polymer was reacted with methyl mercaptan to form a highly saturated methyl mercaptan adduct thereof. This methyl mercaptan adduct contained relatively few double bonds and was of the type considered to be difficult to cure with sulfur. This mercaptan adduct (100 parts) was compounded with the following ingredients:

| | Parts |
|---|---|
| Carbon black (HAF) | 50 |
| Medium process oil | 5 |
| Zinc oxide | 5 |
| Sulfur | 2 |
| Benzothiazyl disulfide | 1.5 |
| Tetramethylthiuram disulfide | 1.75 |
| Stearic acid | 2 |

Portions of this material were then compounded further with 1, 2 and 3 parts, respectively, of a liquid polyallyl glycidyl ether (also sometimes called PAGE). These samples which had been compounded with polyallyl glycidyl ether were cured in a press for 60 minutes at 300° F. The tensile strength, elongation and modulus values were determined on these cured samples. The results of these tests are shown in Table IX:

TABLE IX

| PAGE, parts | 1 0 | 1 | 2 | 3 |
|---|---|---|---|---|
| Tensile, p.s.i. | 1,900 | 2,150 | 2,450 | 2,525 |
| Elongation, percent | 680 | 535 | 460 | 355 |
| 300% modulus, p.s.i. | 900 | 1,300 | 1,750 | 2,200 |

¹ Control.

ing recipe improves the tensile strength and modulus of these cured polymers.

EXAMPLE 14

Another sample of the mercaptan adduct of Example 13 was compounded on a mill as follows:

| | Parts |
|---|---|
| Adduct | 100 |
| Carbon black | 50 |
| Medium process oil | 5 |
| Zinc oxide | 5 |
| Sulfur | 1 |
| Benzothiazyl disulfide | 1 |
| Tetramethylthiuram disulfide | 1 |
| Stearic acid | 2 |

Then part of this sulfur compounded adduct was further compounded with the epoxy compounds in the amount shown in the Table X. These epoxy compounded samples, as well as the control which contained no epoxy groups, were cured in a press for 60 minutes at 300° F. Tensile, elongation and modulus values were determined on these cured samples. The results of these tests are shown in Table X.

TABLE X

| Epoxy Resin Used | Parts | Tensile | Elongation | 300% Modulus |
|---|---|---|---|---|
| Control | None | 1,300 | 690 | 600 |
| EP-201 | 2 | 1,650 | 650 | 700 |
| Vinyl cyclohexene dioxide | 2 | 1,750 | 600 | 800 |
| Do | 4 | 1,800 | 485 | 1,000 |
| Epon 1001 | 2 | 1,810 | 600 | 900 |
| Do | 4 | 1,875 | 480 | 1,150 |
| Epon 828 | 2 | 2,450 | 610 | 960 |
| Do | 3 | 2,600 | 600 | 1,525 |
| Allyl glycidyl ether | 2 | 1,910 | 710 | 645 |

Since this sulfur recipe contained less sulfur and accelerator than the one used in Example 13, the improvement due to the epoxy compound is particularly evident.

Since the procedure used for preparing the thioether containing polymers such as the mercaptan adducts of the homo polymers or copolymers of the dienes may influence the amount of activator required to achieve a cure by the method of this invention, Examples 15 and 16 are included to illustrate this effect. In Example 15, the adduct from Example B was used because the magnesium sulfate and caustic coagulation procedure would yield a product substantially free of acids.

In Example 16, the adduct from Example C was used as the salt-acid coagulation procedure would leave part of the emulsifier behind in the adduct as a free fatty acid residue.

In these two examples the adduct (100 parts) was mill mixed with the amount of the epoxide and activator indicated in the tables of these two examples and then cured in the manner indicated. A comparison of the data for these two examples shows no additional acidic activator was required to obtain a cure when the epoxide was added to the adduct of Example C, but additional activator was required with the adduct of Example B, the one coagulated with magnesium sulfate and caustic.

EXAMPLE 15

In this example 5 parts of the indicated epoxide was used and each sample was cured at the conditions indicated.

| Epoxide | Activator | Parts Added | Conditions | Results |
|---|---|---|---|---|
| G | Control | None | 48 hr./R.T.[1] | No cure. |
| G | Phthalic anhydride | 5 | 48 hr./R.T | Cured. |
| G | Acetic acid | 5 | 48 hr./R.T | Cured. |
| G | Stearic acid | 5 | 48 hr./R.T | Do.[2] |
| O | Phthalic anhydride | 5 | 48 hr./R.T | Do. |
| O | Stearic acid | 5 | 48 hr./R.T | Do.[2] |
| G | N-dodecyl mercaptan | 2 | 2 hr./300° F | Do. |
| N | Phthalic anhydride | 3 | 48 hr./R.T | Do. |
| N | Stearic acid | 4 | 48 hr./R.T | Do. |
| S | Phthalic anhydride | 5 | 48 hr./R.T | Do. |
| K | ----do---- | 5 | 2 hr./300° F | Light cure. |
| I | ----do---- | 5 | 2 hr./300° F | Do. |
| C | ----do---- | 3 | 1 hr./300° F | Cured. |

[1] R.T.=Room Temperature, about 75° F.
[2] Recipe also contained 50 parts carbon black (HAF).

EXAMPLE 16

In this example, portions of the adduct from Example C were mill mixed with epoxides and activators, as indicated in the following table. These samples were then allowed to stand at room temperature for 48 hours and then inspected for cure.

| Epoxide | | Activator added | Remarks |
|---|---|---|---|
| Code | Parts | | |
| G | 2.5 | None | Cured |
| O | 5 | ----do---- | Do. |
| N | 5 | ----do---- | Do. |
| S | 5 | ----do---- | Do. |
| Q | 4 | Phthalic anhydride, 3 parts | Do. |

This experimental evidence suggests at least three kinds of functional groups are required to be present in the reaction mixture for this invention to be operative. These three kinds of functional groups are (1) a thioether group, (2) an epoxy group and (3) an acid. Conceivably two of these groups could be present on the same compound and yet the reaction mixture would be effective. To further illustrate this concept, the mercaptan adduct of the copolymers of a conjugated diene such as isoprene or butadiene with an acid containing olefinic co-monomer such as acrylic or methacrylic acids may be used to form the reaction mixture with thioether compound, in which case it would not be necessary to add an acid per se.

Also, it is known to add mercapto substituted acids to the double bonds in olefinic compounds to produce adducts containing thioether groups and carboxylic acid groups.

EXAMPLE 17

Several mill mixed batches of a polybutadiene-methyl mercaptan adduct were made at high levels of epoxy resin to determine the nature of the resulting products.

TABLE XI

| | Sample | | |
|---|---|---|---|
| | 1 | 2 | 3 |
| Adduct | 100 | 100 | 100 |
| Carbon black | 50 | 50 | 50 |
| Phthalic anhydride | 45 | 15 | 45 |
| Epon 820 | 150 | 100 | |
| Epoxide P | | | 150 |

Samples of these compositions using the recipes shown in Table XI were press cured for 60 minutes at 300° F. Sample 1 was a smooth hard sheet which resembled a slightly flexible plastic. On the other hand, Sample 2 was a soft leathery sheet, while Sample 3 was similar to Sample 1 except quite rough. All three of these sampes exhibited no tendency to disintegrate or swell when soaked in benzene for 24 hours at room temperature.

EXAMPLE 18

A mixture of 100 parts of Epon 820, a benzene solution containing 5 parts of the methyl mercaptan-polybutadiene adduct of Example C, 3 parts phthalic anhydride were mixed together and spread out on a surface in a thin film and allowed to stand at room temperature for three days. After three days this film was insoluble in benzene. Another experiment was run substituting the butyl mercaptan adduct of Example E for the methyl mercaptan adduct of Example C. This composition cured to give a benzene insoluble product.

EXAMPLE 19

The polymer containing n-dodecyl thioether groups from Example F was mixed with 5 parts PAGE (polyallylglycidyl ether) and 3 parts phthalic anhydride. The original mixture was completely soluble in benzene. After four days at room temperature, a portion of the mixture was placed in benzene and found to be insoluble.

EXAMPLE 20

The polymer of Example G, a 6% saturated methyl mercaptan adduct of polybutadiene, was mixed with 5 parts PAGE and 3 parts phthalic anhydride. The originally soluble mixture was insoluble in benzene after standing at room temperature for 3 days.

Since the experimental evidence indicates an acid is necessary to effect a reaction of the mixture comprising a thioether compound and an epoxy compound, an experiment was performed to see if tertiary amines could function as a catalyst for the system in a manner analogous to that obtained with a reaction mixture of epoxy resin, an acid and a tertiary amine. The results of this experiment are shown in Example 21.

EXAMPLE 21

A rubbery butadiene/styrene copolymer was treated with methyl mercaptan to form an adduct which was about 90% saturated. Then a 1000 parts of this adduct was milled with 500 parts carbon black (HAF) to form a black stock, R24X1329.

This black stock was compounded with the ingredients shown in the table and press cured for 60 minutes at 300° F. The physical properties on these samples after subjection to the press cure are shown.

TABLE XII

| | Recipe Number | | | |
|---|---|---|---|---|
| | 1 | 2 | 3 | 4 |
| Black stock, R24X1329 | 150 | 150 | 150 | 150 |
| Phthalic anhydride | 3 | | 2 | 2 |
| Triethanol amine | | 4 | | |
| Morpholine | | | | 1 |
| Epoxide N | 5 | 5 | | |
| Epoxide P | | | 12 | 12 |
| Tensile | 1,250 | (¹) | 1,865 | 300 |
| Elongation | 580 | (¹) | 590 | 630 |
| 300% modulus | 670 | (¹) | 940 | 260 |

¹ No cure.

The above data on tensile, elongation and modulus show that the amine inhibited the curing reaction. In the composition formed with recipe 4 there was a small excess of acid relative to the tertiary amine; therefore some cure was obtained.

This evidence suggests that the amine free reaction mixtures of this experiment must react in a manner different from the amine catalyzed reaction of acids and epoxides; otherwise, a cure would have been obtained with those recipes containing excess amine relative to the acid.

EXAMPLE 22

In this example a natural rubber latex, a high cis-polyisoprene rubber, i.e. in excess of about 50%, was reacted with sufficient methyl mercaptan to saturate 50% of the rubber's double bonds. Then 100 parts of this adduct rubber was compounded with 12 parts epoxide P and 2 parts of phthalic anhydride. A portion of this composition was press cured at 300° F. for 60 minutes. The press cured sample was 21% soluble in benzene and had a swell volume of 19.6.

Another portion was allowed to stand for a week at 60–75° F., before determining the solubility and swell volume. The solubility and swell volume on this sample was 18.1% and 14.4% respectively.

Similar cures may be obtained with the mercaptan adducts of high cis or high trans-polybutadienes.

In this invention, a method is provided which is entirely different from the prior art curing systems for epoxy compounds since this curing system does not employ the so-called active hydrogens found in mercaptans, alcohols, amines, or acid groups to effect the cure. In fact, it should be recalled that Example 21 disclosed the presence of amines to be detrimental. In this invention, the cure or reaction is effected by forming a reaction mixture comprising a thioether containing compound and an epoxy containing compound in the presence of sufficient acidic containing material to activate or effect said reaction, and then reacting the ingredients of said mixture at a reaction temperature which may vary, within wide limits from about room temperature, say 50° F. to as high as 300° F. or higher, with the time and pressure required to bring about said reaction being a matter of convenience depending upon the results desired. Thus the reaction mixture may be formed and allowed to stand at room temperature for hours or days, depending on the reactivity of the ingredients, to achieve the desired results, or the reaction may be accelerated by heating to an elevated temperature from 200 to 300° F. for a few minutes; normally 30 to 90 minutes. Pressure may be used, if desired, to shape the final product but it is not necessary, where the reaction mixture is pourable.

The actual mechanism of the curing or reaction system in this invention is not known. However, quite surprisingly, when a compound containing more than one thioether group, is mixed with an epoxy containing compound, containing at least one oxirane ring, while in the presence of an acidic organic compound, cross-links or molecular growths are obtained. Furthermore, if the molecular weight and functionality of the ingredients in the reaction mixture are properly chosen, the resulting reaction product will exhibit properties varying from viscous liquids to high molecular weight leathery, brittle, plastic or elastomeric materials.

While certain representative embodiments and details have been shown for the purpose of illustrating the invention, it will be apparent to those skilled in this art that various changes and modifications may be made therein without departing from the spirit or scope of the invention.

What is claimed is:

1. A brittle to elastomeric reaction product of (a) at least one organic compound containing more than one functional thioether group with (b) at least one organic compound containing at least two functional epoxy groups, and (c) at least one organic acidic compound, with at least one of said organic compounds containing more than one functional group, the reaction of said orgnaic compounds occurring in the presence of 0.02 to 3 chemical equivalents and higher of reagent (b) for each 100 parts of reagent (a), and sufficient acid to effect said reaction.

2. The reaction product of claim 1 wherein one of the organic compounds has a molecular weight of at least 1000.

3. The product of claim 1 wherein the active thioether group(s) depend from the main backbone of said organic compound.

4. A brittle to elastomeric reaction product of a mixture of an organic compound containing more than one functional alkyl thioether group with another organic compound containing at least two epoxy groups, the reaction of said organic compounds occurring in the presence of 0.02 to 3 chemical equivalents and higher of the organic compound containing the epoxy groups for each 100 parts of the organic compound containing the thioether groups and substantially an equivalent amount of an organic acidic compound based on the compound containing the epoxy group to effect said reaction and where at least one of said organic compounds has a molecular weight in excess of about 1000.

5. The reaction product of (a) an epoxy compound with (b) a polymeric compound containing pendant thioether groups, said compound being a derivative of a polydiene which has had at least some of the unsaturation present in said polydiene saturated by the addition of an organic mercaptan to form pendant thioether groups, the reaction of the epoxy compound with the polymeric compound occurring in the presence of 0.02 to 0.05 chemical equivalents of the epoxy compound per 100 parts of said polymeric compound, an amount of an acidic organic compound to give a chemical equivalent ratio of acid to epoxy compound of about 0.5 to greater than 3 to effect said reaction.

6. The reaction product of claim 5 wherein the organic mercaptan is an alkyl mercaptan.

7. A method of fixing a mobile plasticizer within a plasticized composition, said mobile plasticizer being selected from the class consisting of a compound containing at least one thioether group and a compound containing at least one epoxy group comprising the steps (1) of forming in situ within the plasticized composition a reaction mixture comprising (a) an organic compound containing at least one active thioether group and having a molecular weight in excess of 150, and (b) another organic compound containing at least one active epoxy group and (c) an organic acidic compound, said organic acidic compound being present in an amount sufficient to have one reactive functional group for each epoxy group and said organic compound containing the epoxy group being present in 0.02 to 3 chemical equivalents per 100 parts of the organic compound containing the thioether group and (2) then reacting said mixture to increase the molecular weight of the compound containing the thioether group.

8. A process for reacting an organic compound containing thioether groups to increase the molecular weight of said organic compound comprising (1) forming a reaction mixture comprising (a) an organic compound of at least 1000 molecular weight and containing more than one pendant thioether group, (b) an epoxy compound and (c) an organic acidic compound, such compound of (b) being present in 0.02 to 3 chemical equivalents per 100 parts of the compound of (a) and the acidic compound being present in the ratio of about 0.5 to more than 3 chemical equivalents for each chemical equivalent of the epoxy compound, and (2) reacting said mixture at a temperature of 70 to 300° C. to obtain an elastomeric product.

9. The process of claim 8 wherein the organic compound contains pendant alkyl thioether groups.

10. The process of claim 8 wherein the reaction mixture contains an inert filler.

11. A composition of matter comprising a mixture of (1) a poly(vinyl alkyl thioether), (2) an epoxy compound and (3) an acidic compound, said acidic compound being present in at least about 0.5 to 3 equivalents for each equivalent weight of epoxy compound.

12. A composition of matter comprising (1) a thioether containing material obtained by the addition of an organic mercaptan to an unsaturated polymer prepared by the polymerization of a conjugated diene having from 4 to 6 carbon atoms, (2) an epoxy compound and (3) an acidic compound, said acidic compound being present in at least about 0.5 to 3 equivalents for each equivalent of epoxy compound, said epoxy compound being present essentially in one mol for each mol of thioether containing material.

13. The composition of claim 12 wherein the organic mercaptan is an alkyl mercaptan having from 1 to about 20 carbon atoms, and said thioether containing material having at least two thioether groups per molecule.

14. The composition of claim 12 wherein the unsaturated polymer is a copolymer of said conjugated dienes and a monomer containing a vinylidene group copolymerizable with said diene.

15. A composition of matter comprising a mixture of (a) an organic compound containing more than one active thioether group, (b) another organic compound containing at least one epoxy group, (c) an organic acidic compound having an ionization constant of about $1 \times 10^{-10}$ to about $1 \times 10^{-3}$ and (d) an inert filler in the amounts of about 5 to 100 parts per hundred parts of the organic compound containing an active thioether group, said compound of (b) being present in an amount of 0.02 to 3 chemical equivalents per 100 parts of the compound (a) and about 0.5 to more than 3 chemical equivalents of the acidic compound for each chemical equivalent of the compound (b).

16. The reaction product of (a) at least one organic compound containing more than one functional thioether group, said thioether group being the sole reactive group present in said compound with (b) at least one organic compound containing at least one functional epoxy group, and (c) at least one organic acidic compound having an ionization constant of about $1 \times 10^{-10}$ to about $1 \times 10^{-3}$, with at least one of said organic compounds containing more than one functional group, the reaction of said organic compounds occurring in the presence of 0.02 to 3 chemical equivalents, the organic compound containing the epoxy group per 100 parts of the compound containing the thioether groups and about 0.5 to more than 3 chemical equivalents of the acidic compounds for each chemical equivalent of the compound containing the epoxy group.

17. The reaction product of claim 16 wherein the organic compound containing thioether groups has a molecular weight of at least 1000.

18. A composition of matter obtained by reacting a reaction mixture comprising (a) at least one organic compound containing more than one functional thioether group, said thioether group being the sole reactive group present in said compound, with (b) at least one organic compound containing at least one functional epoxy group, (c) at least one organic acidic compound having an ionization constant of $1 \times 10^{-10}$ to about $1 \times 10^{-3}$, with at least two of said organic compounds containing more than one functional group, and (d) five to 100 parts of a reinforcing agent per hundred parts of the thioether compound, said reinforcing agent being selected from the class consisting of the carbon blacks and the finely divided silicas.

19. A process for reacting an organic compound containing thioether groups to increase the molecular weight of the said organic compound comprising (1) forming a reaction mixture comprising (a) an organic compound containing more than one thioether group, said thioether group being the sole reactive group present in said organic compound, (b) an epoxy compound, and (c) an organic acidic compound having an ionization constant of about $1 \times 10^{-10}$ to about $1 \times 10^{-3}$, with the amount of the organic acidic compound being at least equivalent to the amount of the epoxy compound and said epoxy compound being present in about 0.02 to 3 chemical equivalents per 100 parts of the organic compound containing the thioether groups, and (2) reacting said mixture at a temperature of about 80 to 300° F.

20. The process of claim 19 wherein the organic compound containing at least one thioether group contains no active hydrogen.

References Cited
UNITED STATES PATENTS

| | | |
|---|---|---|
| 2,543,845 | 3/1951 | Fryling _____ 260—79.5 |
| 2,543,867 | 3/1951 | Pitchard _____ 260—79.5 |
| 2,556,856 | 6/1951 | Swaney et al. _____ 260—79 |
| 2,660,563 | 11/1953 | Banes et al. _____ 260—85.1 |
| 2,731,437 | 1/1956 | Bender et al. |
| 2,858,291 | 10/1958 | McAdam. |
| 2,886,473 | 5/1959 | Schroeder. |
| 2,915,494 | 12/1959 | Snoddon _____ 260—836 |
| 2,932,627 | 4/1960 | Greenspan et al. ___ 260—85.1 |
| 3,114,731 | 12/1963 | Rumscheidt et al. ____ 260—47 |

MORRIS LIEBMAN, *Primary Examiner.*

LEON J. BERCOVITZ, *Examiner.*

K. B. CLARKE, J. E. CALLAGHN, *Assistant Examiners.*